United States Patent [19]
Kleine

[11] Patent Number: 5,775,445
[45] Date of Patent: Jul. 7, 1998

[54] DRILLING UNIT WITH HOLLOW ANNULAR DRILL BIT AND CENTRAL DRILL

[76] Inventor: Werner Kleine, An der Marsch 29, D-28832 Achim, Germany

[21] Appl. No.: 524,013

[22] Filed: Sep. 5, 1995

[30] Foreign Application Priority Data

Oct. 15, 1994 [DE] Germany .................. 44 36 917.4

[51] Int. Cl.$^6$ .................................................. E21B 10/00
[52] U.S. Cl. ............................................................. 175/385
[58] Field of Search ........................... 175/385, 388; 408/206

[56] References Cited

U.S. PATENT DOCUMENTS

| | | |
|---|---|---|
| 616,928 | 1/1899 | Isgrig et al. ................. 175/385 |
| 5,466,099 | 11/1995 | Sullivan et al. ............... 408/206 |

*Primary Examiner*—William P. Neuder
*Attorney, Agent, or Firm*—Anderson Kill & Olick, P.C.

[57] ABSTRACT

A drilling unit is formed of a hollow annular drill bit (1) and a centering drill (2) where the centering drill is a single piece including a chucking shank (2a) and a drill head (2b). A detachable connection is provided between the annular drill bit (1) and the centering drill (2), preferably in the form of a thread (3) whereby the drilling unit can be provided with different diameter annular drill bits (1) and can be adapted to different applications as well as to different power tools presently in use.

1 Claim, 1 Drawing Sheet

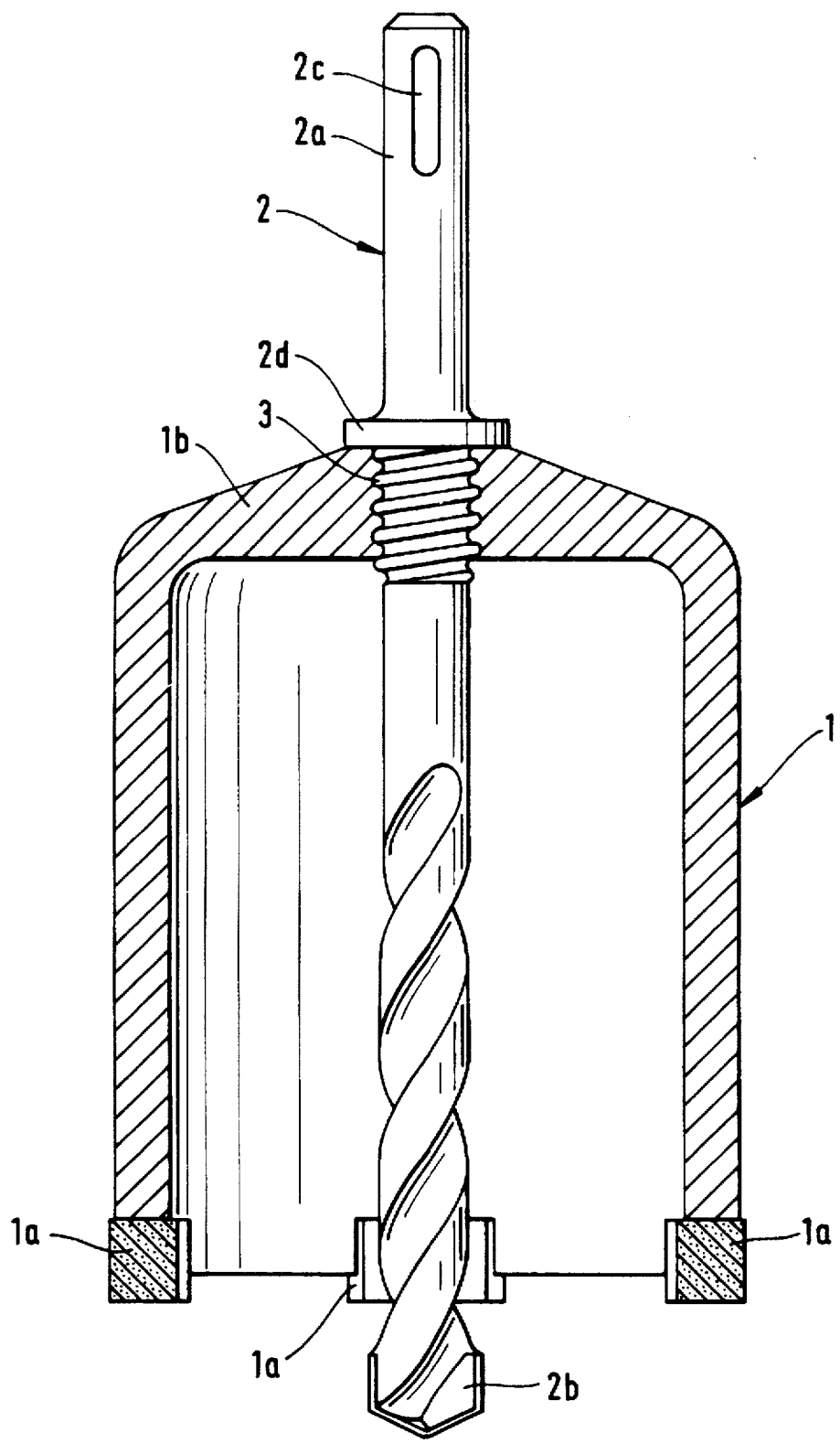

DRILLING UNIT WITH HOLLOW ANNULAR DRILL BIT AND CENTRAL DRILL

BACKGROUND OF THE INVENTION

The present invention is directed to a drilling unit formed of a hollow annular drill bit and a centering drill, with the centering drill including a chucking shank at its trailing end and a drill head at its leading end. The centering drill extends through the hollow annular drill bit, so that the drill head at its leading end projects beyond the leading end face of the hollow annular drill bit. Further, the trailing end of the centering drill chucking shank projects axially from the trailing end face of the annular drill bit.

Drilling units incorporating a hollow annular drill bit of the type described above are operated by a power or driving tool designed to supply at least a rotary motion and, in certain cases, also a percussive motion. Such drilling units are inserted into the power tool by means of a chucking shank matched to the tool being used.

To prevent any off center running on or in the material being worked, such as masonry, concrete, rock and the like, during spot drilling as well as in the ensuing drilling operation, the known drilling units are provided with a centering drill having a drill head at its leading end region.

Known drilling units are constructed according to the building block principle, in particular for logistical reasons, that is, the chucking shank and drill head of the centering drill as well as the hollow annular drill bit are formed as individual parts and are assembled into the drilling unit as required. Such a construction has logistical advantages, however, it assumes that the operator has adequate specialized knowledge and a certain skill. In addition, the connection points of the individual parts must meet quite high demands, whereby an effective assembly of these parts exposed to considerable stresses and contamination is assured. In particular, connecting the drill head of the centering drill with the remaining parts experiences considerable difficulties for assuring a sound connection or assembly as well as disassembly. To avoid the above disadvantages, which have resulted in increased prices of all of the parts due in particular to the exacting connection points, a drilling unit is known from CH PS 185 076 where the centering drill is formed as a single piece, with the chucking shank located at the trailing end and a drill head positioned at the leading end. This centering drill formed in one piece is fixed to the hollow annular drill bit.

The above connection problems were solved by this known drilling unit, whereby an economic solution was achieved. It must not be forgotten, however, that various power tools for such drilling units are available on the market and thus matching the chucking shank to the power tool to be used is required. Furthermore, it is necessary, depending upon the individual application, to vary the length of the drilling unit by using a specific hollow annular drill bit along with, specific chucking shank.

Adapting to different conditions, in particular as far as power tools and different applications are concerned, cannot be effected with the above mentioned known drilling unit, so that again logistical problems arise, because a specific unit must be provided for each power tool and each specific application.

SUMMARY OF THE INVENTION

Therefore, the primary object of the present invention is to provide a drilling unit which on one hand affords economical as well as handling advantages, and, on the other hand, is well adapted to the various applications to be encountered.

In accordance with the present invention, a detachable connection is provided between the centering drill and the hollow annular drill bit.

Based on the invention, only one connecting region is required, since the centering drill is formed as a single piece including the chucking shank and the drill head. This arrangement eliminates the problems of connecting the drill head of the centering drill with other parts. The detachable connection between the centering drill and the hollow annular drill bit assures the adaptation to the various conditions experienced, by combining centering drills with chucking shanks of different lengths with hollow annular drill bits suitable for the particular application. Equally, hollow annular drill bits of different diameters can be combined with the chucking shank suitable for the individual application. If the hollow annular drill bit or the centering drill experiences premature wear, the worn part can be replaced with a new part without requiring the replacement of the entire drilling unit, and thereby affording additional economic advantages.

The detachable connection is achieved in a preferred manner as a helical or screw thread. Such a thread, combined with suitable end stops, assures a safe connection which can be disassembled at any time. Various forms of threads known as such can be used, such as a round thread, a trapezium shaped thread or the like including modifications of such threads.

BRIEF DESCRIPTION OF THE DRAWINGS

The drawing is an axially extending view, partly in section, of a drilling unit embodying the present invention.

DETAILED DESCRIPTION OF THE INVENTION

A drilling unit, as shown in the drawing, is formed of a hollow annular drill bit 1 and an axially elongated centering drill 2 each of which has a leading end facing downwardly in the drawing and a trailing end facing upwardly. The hollow annular drill bit 1 and the centering drill 2 are detachable connected together by a helical or screw thread 3.

In its trailing end region, the centering drill 2 has a chucking shank 2a and at its leading end a drill head 2b. The chucking shank 2a has an axially extending recess or groove 2c, known as such, for receiving entrainment elements of a power tool in which the drilling unit is used. The hollow annular drill bit is bell shaped in a known manner with cutting elements 1a at its leading end. The drill head 2b as shown in the drawing, projects axially outwardly from the leading end region of the hollow annular drill bit 1 containing the cutting elements 1a.

Base 1b forms the trailing end of the hollow annular drill bit 1 with the base extending transversely of the axial direction of the centering drill. The base 1b forms a portion of the helical thread 3. The other portion of the helical thread 3 is located on the centering drill 2 adjacent a collar 2d located at the leading end of the chucking shank 2a. The collar 2d forms an end stop limiting the travel of the hollow annular bit 1 on the centering drill 2. If necessary, the collar transmits percussive blows by the power tool to the hollow annular drill bit 1, without causing excessive stresses to or applying a load to the helical thread 3.

While specific embodiments of the invention have been shown and described in detail to illustrate the inventive principles, it will be understood that the invention may be embodied otherwise without departing form such principles.

I claim:

1. Drilling unit comprising a axially extending hollow annular drill bit (1) having a leading end and a trailing end and an axially extending centering drill (2) having a leading end and a trailing end, said centering drill (2) having an axially extending chucking shank (2a) extending from the trailing end and a drill head (2b) at the leading end thereof, said centering drill extending through the trailing end of said annular drill bit (1) with said drill head (2b) projecting axially outwardly from the leading end of said annular drill bit and the chucking shank (2a) projecting axially outwardly from the trailing end of said annular drill bit, wherein the improvement comprises a detachable connection between said centering drill and said annular drill bit (1), said annular drill bit is a single piece and bell-shaped with said trailing end thereof comprising a base (1b) extending transversely of said centering drill, said base (1b) having a first surface and a second surface each extending transversely of said centering drill with said first surface facing toward the leading end of said annular drill bit (1) and said second surface forming the trailing end of said annular drill bit, said detachable connection comprises a helical thread (3) formed in part on said centering drill (2) and in part in said base (1b) of said annular drill bit (1), said centering drill (2) is a single piece and has an annular collar-like stop (2d) formed on the leading end of said chucking shank (2a) extending transversely of said centering drill radially outwardly from said helical stop and with said helical thread on said centering drill extending axially from said stop towards the leading end of said centering drill, and with said stop bearing against the second surface of said base (1b) of said annular drill bit (1).

* * * * *

UNITED STATES PATENT AND TRADEMARK OFFICE

CERTIFICATE OF CORRECTION

PATENT NO.   : 5,775,445
DATED        : July 7, 1998
INVENTOR(S)  : Werner Kleine It is certified that error appears in the above-identified patent and that said Letters Patent is hereby corrected as shown below:

On the title page, insert item:

[73]  **Assignee: Hilti Aktiengesellschaft,
                    Schaan, Liechtenstein**

Signed and Sealed this

Twenty-third Day of March, 1999

Attest:

Q. TODD DICKINSON

*Attesting Officer*     *Acting Commissioner of Patents and Trademarks*